US012022855B2

(12) United States Patent
Holzbauer et al.

(10) Patent No.: US 12,022,855 B2
(45) Date of Patent: Jul. 2, 2024

(54) JUICING APPARATUS AND JUICING METHOD

(71) Applicant: KONINKLIJKE PHILIPS N.V., Eindhoven (NL)

(72) Inventors: Juergen Holzbauer, Maria Rain (AT); Christian Mikula, St. Jakob I.R. (AT); Thomas Otti, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 529 days.

(21) Appl. No.: 16/621,425

(22) PCT Filed: Jun. 21, 2018

(86) PCT No.: PCT/EP2018/066516
§ 371 (c)(1),
(2) Date: Dec. 11, 2019

(87) PCT Pub. No.: WO2019/002064
PCT Pub. Date: Jan. 3, 2019

(65) Prior Publication Data
US 2020/0113221 A1    Apr. 16, 2020

(30) Foreign Application Priority Data
Jun. 30, 2017   (EP) .................................... 17178972

(51) Int. Cl.
*A23N 1/02*      (2006.01)
*A47J 19/02*     (2006.01)

(52) U.S. Cl.
CPC .............. *A23N 1/02* (2013.01); *A47J 19/027* (2013.01)

(58) Field of Classification Search
CPC .. A23N 1/02; A23N 1/00; A47J 19/027; A47J 19/02; A23L 2/04; B01D 19/02
See application file for complete search history.

(56) References Cited

U.S. PATENT DOCUMENTS

| | | | |
|---|---|---|---|
| 1,449,114 A | * | 3/1923 | Hayduck ................ B01D 19/02 159/16.1 |
| 1,953,714 A | | 4/1934 | Jenkins |
| 2,299,553 A | | 10/1942 | McKinnis |

(Continued)

FOREIGN PATENT DOCUMENTS

| | | |
|---|---|---|
| CN | 1863465 A | 11/2006 |
| CN | 101703365 A | 5/2010 |

(Continued)

OTHER PUBLICATIONS http://pressbooks-dev.oer.hawaii.edu/collegephysics/chapter/6-2-centripetal-acceleration/ (Year: 2022).*

(Continued)

*Primary Examiner* — Sean M Michalski
(74) *Attorney, Agent, or Firm* — Maschoff Brennan (57) ABSTRACT

A juicer combines a juice extracting arrangement for providing extracted juice and a centrifuge unit for separating a juice component of the extracted juice from a foam component of the extracted juice. An output gate of the centrifuge unit allows the passage of the juice component to an outlet. In this way, the outlet has reduced (or eliminated) foam content, which is appreciated by users.

15 Claims, 7 Drawing Sheets

(56) References Cited

U.S. PATENT DOCUMENTS

| | | | | |
|---|---|---|---|---|
| 2,401,469 | A | * | 6/1946 | Edwards ................ B01D 19/02 494/35 |
| 2,541,084 | A | * | 2/1951 | Meier ................... A47J 19/027 99/511 |
| 2,634,907 | A | | 4/1953 | Smith |
| 3,346,392 | A | | 10/1967 | Edison |
| 3,923,241 | A | * | 12/1975 | Cyphelly ............... B04B 1/2016 494/60 |
| 3,975,546 | A | * | 8/1976 | Stahmann ................ A23J 1/007 426/655 |
| 4,345,517 | A | * | 8/1982 | Arao ..................... A47J 19/027 99/511 |
| 4,369,698 | A | * | 1/1983 | Hemfort .............. A23N 15/025 494/9 |
| 4,439,415 | A | * | 3/1984 | Hennart ................. A01N 53/00 424/416 |
| 4,508,546 | A | * | 4/1985 | Zlokarnik ............. B01D 19/02 95/242 |
| 4,522,119 | A | * | 6/1985 | Finch ........................ C11B 1/06 100/145 |
| 4,867,998 | A | * | 9/1989 | Ralvert ................... A23L 33/22 426/489 |
| 4,882,317 | A | * | 11/1989 | Marburg ................ A61K 47/65 536/55.1 |
| 4,924,770 | A | * | 5/1990 | Raub ........................ A23N 1/02 99/511 |
| 4,968,295 | A | * | 11/1990 | Neumann ........... A61M 1/3696 700/282 |
| 5,031,522 | A | * | 7/1991 | Brixel ....................... B04B 7/18 494/36 |
| 5,222,430 | A | | 6/1993 | Wang |
| 5,445,070 | A | * | 8/1995 | Rebel .................... A47J 43/085 366/331 |
| 5,613,430 | A | * | 3/1997 | Lee ....................... A47J 19/025 241/261.1 |
| 5,656,180 | A | * | 8/1997 | Pieralisi ................. C12G 1/005 210/781 |
| 5,743,176 | A | * | 4/1998 | Anderson ................ A23N 1/00 99/512 |
| 6,202,547 | B1 | * | 3/2001 | Tseng ....................... A23N 1/02 99/511 |
| 6,655,615 | B1 | * | 12/2003 | Hartmann ................ A23N 1/02 241/86.1 |
| 6,742,447 | B1 | * | 6/2004 | Chen ..................... A47J 19/027 99/510 |
| 8,978,545 | B2 | | 3/2015 | Yoakim |
| 9,713,780 | B2 | * | 7/2017 | Hays ...................... B04B 11/06 |
| 2004/0007139 | A1 | * | 1/2004 | Catelli ..................... A23N 1/02 99/510 |
| 2005/0194853 | A1 | * | 9/2005 | Fout ...................... B04B 1/2016 310/103 |
| 2007/0108105 | A1 | * | 5/2007 | Burnett .............. B01D 33/0315 209/17 |
| 2010/0089253 | A1 | * | 4/2010 | Bourgeois-Potage ...... A47J 19/027 99/512 |
| 2011/0061534 | A1 | | 3/2011 | Ozanne |
| 2012/0077035 | A1 | * | 3/2012 | Spahr ....................... C09D 5/24 252/502 |
| 2015/0201667 | A1 | * | 7/2015 | Sauer ....................... A23N 1/02 99/510 |
| 2016/0096123 | A1 | * | 4/2016 | Hays ................... B04B 11/06 96/183 |
| 2017/0029754 | A1 | * | 2/2017 | Ferrarini .............. C12G 1/0203 |
| 2022/0186391 | A1 | * | 6/2022 | Hao ................... B01D 19/0036 |

FOREIGN PATENT DOCUMENTS

| | | |
|---|---|---|
| CN | 102961062 | 3/2013 |
| CN | 204426608 U | 7/2015 |
| EP | 0343469 | 11/1989 |
| KR | 20140001325 U | 3/2014 |
| WO | 2015/176118 | 11/2015 |

OTHER PUBLICATIONS

International Search Report and Written Opinion dated Oct. 11, 2018 for International Application No. PCT/EP2018/066516 Filed Jun. 21, 2018.

* cited by examiner

JUICING APPARATUS AND JUICING METHOD

CROSS REFERENCE TO RELATED APPLICATIONS

This application is the U.S. National Phase application under 35 U.S.C. § 371 of International Application No. PCT/EP2018/066516 filed Jun. 21, 2018, published as WO 2019/002064 on Jan. 3, 2019, which claims the benefit of European Patent Application Number 17178972.0 filed Jun. 30, 2017. These applications are hereby incorporated by reference herein.

FIELD OF THE INVENTION

This invention relates to a juicing apparatus and juicing method, and in particular relates to reducing (or eliminating) the foam in the juice which is delivered as the output.

BACKGROUND OF THE INVENTION

When freshly made juice rests, it separates into layers of different density. Typically, there is a lower layer of clear juice, a middle layer of foam with high fiber content, and a top layer of lighter foam.

The thickness of the top and middle layers depends on various parameters such as the kind of food being juiced (such as apples), the juicing technology used (such as high speed juicing, masticating or blending) and the resting time.

The foam layers consist of air pockets separated by juice layers. These juice layers are extremely stable because of the presence of surfactants. Surfactants are molecules which have a hydrophilic and a hydrophobic side. The molecules align in a way that the hydrophobic side points into the direction of the air pocket and the hydrophilic side points into the juice layer (which is mainly water).

Figure 1:
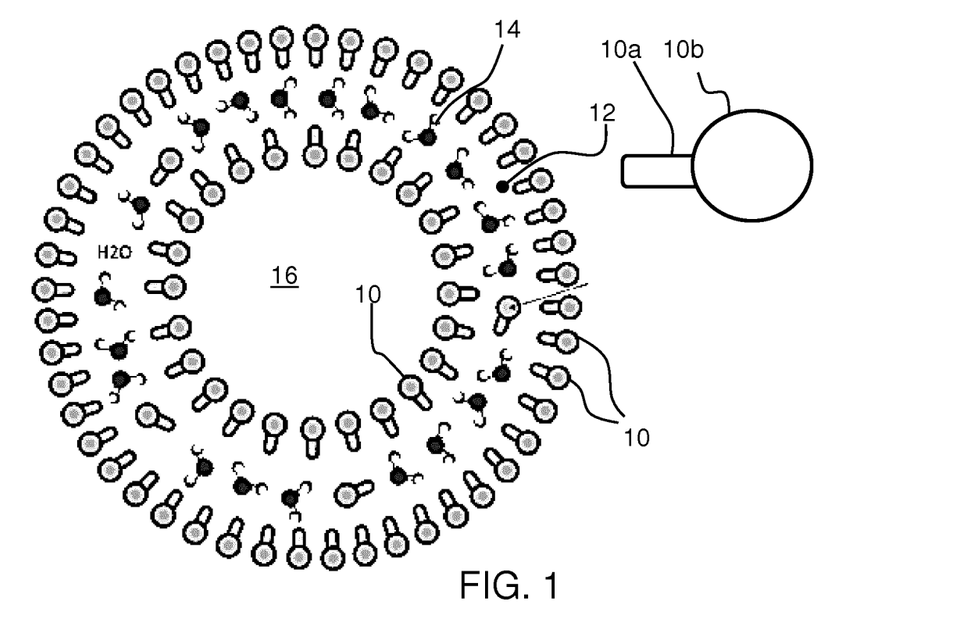
FIG. 1 shows how air bubbles are formed in liquid juice.

This effect is shown in FIG. 1. Two surfactant layers are shown as two concentric rings of molecules 10, each having a hydrophilic side 10a and a hydrophobic side 10b. The hydrophilic sides trap a layer 12 of juice, mainly comprising water molecules 14. The inner layer of surfactant molecules traps an air bubble 16, and these air bubbles are present in the foam layers.

The foam itself is not tasty and leads to dissatisfaction of the customer. This disadvantage is present in nearly every type of juicer.

The invention is directed to the problem of providing a juicer output without the foam. The invention is of interest for any type of juicer which produces foamy juice as a result of the juicing process.

SUMMARY OF THE INVENTION

According to examples in accordance with an aspect of the invention, there is provided a juicer, comprising:
an inlet for receiving food items to be juiced;
a juice extracting arrangement for providing extracted juice;
a centrifuge unit for receiving the extracted juice and performing centrifuging to separate a juice component of the extracted juice from a foam component of the extracted juice, wherein the centrifuge unit has an output gate for allowing the passage of the juice component; and
an outlet from which the juice component is delivered.

This arrangement performs a two-stage juicing process. The first stage is a conventional juicing operation, which may result in the generation of unwanted foam. The second stage is a centrifuge operation, which separates the foam from the pure liquid, and may optionally also serve to destroy the foam by causing the release of the air pockets.

The juice extracting arrangement may comprise any known appliance for extracting juice, such as:
a centrifugal juicer;
a masticating juicer;
a triturating juicer; or
a blender.

The juice extracting arrangement may have a vertical or horizontal food processing element (e.g. blender blade or auger).

Different types of food processing appliance will result in different amounts of foam, but in each case the addition of the centrifuge unit enables the final juice outlet to have a substantially reduced foam content.

The centrifuge unit may comprise a chamber which receives the extracted juice, wherein the chamber has a chamber inlet and a chamber outlet set back from the outer portion of the chamber. The terms "inner" and "outer" are used in this context to refer to radial positions. By setting back the chamber outlet from the outer edge of the chamber, the last portion of the juice will not reach the outlet. Thus when all the juice has been delivered, any remaining foam may stay inside the chamber.

The output gate may for example comprise a blocking element which covers the chamber outlet and defines a gap between an outer edge of the blocking element and an outer wall of the chamber such that the juice component is adapted to pass through the gap before reaching the chamber outlet. In this way, only the juice which is at the very radial outer edge of the chamber is passed to the outlet. Thus, only the more dense clear juice reaches the outlet, having passed around a labyrinth type gate.

The juice extracting arrangement for example comprises a rotary juice extracting member, and a motor for driving the rotary juice extracting member.

The centrifuge unit may comprise a chamber which is driven to rotate by the same motor. In this case, a gearing arrangement may be provided to drive the chamber and the rotary juice extracting member at different rotational speeds.

Alternatively, the centrifuge unit may comprise a chamber which is driven to rotate by a separate motor. Thus different ways of powering the centrifuge unit are possible, either as an integrated component or as an add on component.

The centrifuge unit may thus be:
formed within a housing of the juicer; or
formed as a detachable attachment to a housing of the juicer.

When the centrifuge unit is formed within the housing of the juicer, the juice extracting arrangement and the centrifuge unit may share a common juice extraction chamber. In this way, the juice extraction and the centrifuge process may be performed in a more compact way.

The centrifugal acceleration is for example at least 50 m/s². This has been found to ensure at least the separation of juice and foam.

The centrifugal acceleration may be between 50 and 200 m/s². This range has been found to enable separation of foam and juice but without requiring high rotation speeds, hence enabling power efficient and low cost operation A foam storage container may be provided for storing the separated foam.

The centrifugal acceleration may be between 200 and 900 m/s$^2$. This range has been found to enable at least partial destruction of the foam. This requires a higher rotation speed, but it gives the advantage that there is a reduced storage requirement for separated foam. The rotation speed may be considered to be in a middle range, so that the power efficiency is still high, and vibrations can easily be managed.

The centrifugal acceleration may be between 900 and 3000 m/s$^2$. This range has been found to enable substantially complete foam destruction so avoiding the need for foam storage, thus enabling a more compact appliance.

Examples in accordance with another aspect of the invention provide a juicing method, comprising:
  receiving food items to be juiced;
  providing extracted juice;
  performing centrifuging to the extracted juice to separate a juice component of the extracted juice from a foam component of the extracted juice; and
  passing the juice component through an output gate to an outlet from which the juice component is delivered.

The method may comprise providing a centrifugal acceleration of at least 50 m/s$^2$, for example in the range 200 to 900 m/s$^2$.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a juicer which combines a juice extracting arrangement for providing extracted juice and a centrifuge unit for separating a juice component of the extracted juice from a foam component of the extracted juice, optionally by destroying the foam component. An output gate of the centrifuge unit allows the passage of the juice component to an outlet. In this way, there is reduced (or eliminated) foam content, which is appreciated by users.

Figure 2:
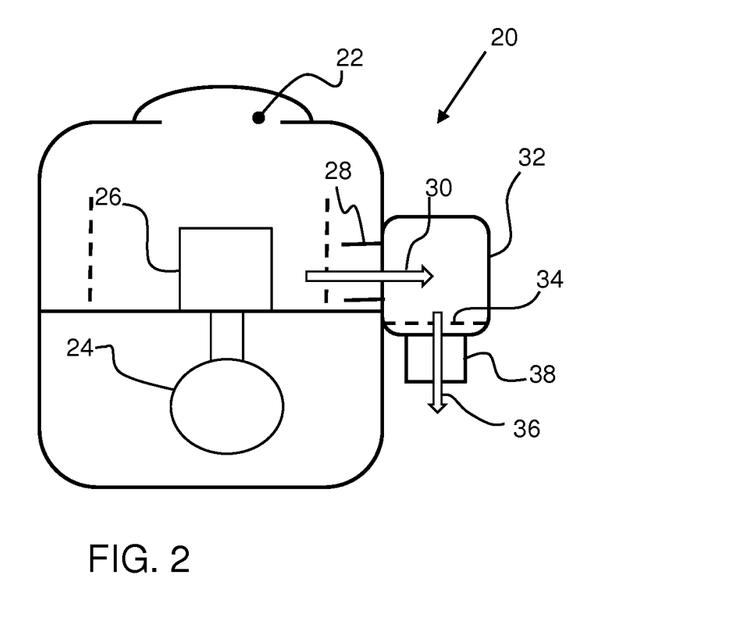
FIG. 2 shows a juicer in accordance with the invention in schematic form.

FIG. 2 shows an example of a juicer in accordance with the invention.

The juicer 20 comprises an inlet 22 for receiving food items to be juiced and a juice extracting arrangement for providing extracted juice. The juice extracting arrangement comprises a motor 24 and a rotary element for processing the food items to extract the juice. The processing may involve cutting, masticating or squeezing for example. There is an intermediate outlet 28 from which extracted juice 30 is provided, and this juice will include a foam component.

A centrifuge unit 32 is provided for receiving the extracted juice 30 and performing centrifuging to separate a juice component of the extracted juice from a foam component of the extracted juice. The centrifuge unit has an output gate 34 for allowing the passage of the juice component 36 to an outlet 38.

This arrangement performs a two-stage juicing process. The first stage is a conventional juicing operation, which may result in the generation of unwanted foam. The second stage is a centrifuge operation, which separates the foam from the pure liquid, and it may also serve to destroy the foam by causing the release of the air pockets.

The juice extracting arrangement 24, 26 may comprise any known appliance for extracting juice, such as:
  a centrifugal juicer;
  a masticating juicer;
  a triturating juicer; or
  a blender.

A centrifugal juicer is typically used to grind fruit and vegetables then push the extracted juice through a strainer by spinning at a very high rotational speed. The pulp is disposed of into a container. Centrifugal juicers are typically the fastest option. However, the pulp tends to be fairly moist meaning there is some juice wastage.

A masticating juicer uses a single gear to chew fibers and break up the cells of produce in a spiral rotating motion. The masticating juicer gives a high quality juice due to the slower juicing process.

A triturating (twin gear) juicer turns at a slower speed than most juicers and has a two-step extraction process. The first step crushes the food items, while the second step presses the juice. This process gives more fiber, enzymes, vitamins and trace minerals. The juicing time is longer with twin gear juicers due to the slower juicing process.

A blender may also be used to extract juice, although a blending process gives a less smooth juice output. However, it thus preserves more of the pulp for consumption and is thus less wasteful.

These different food processing approaches will result in different amounts of foam. In each case the addition of the centrifuge unit 32 enables the final juice outlet to have a substantially reduced foam content.

Figure 3:
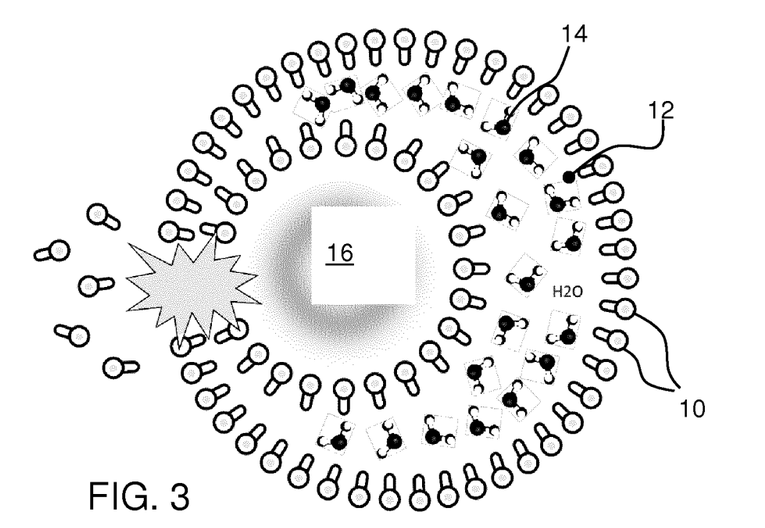
FIG. 3 shows how air bubbles may be removed by centrifugal forces.

FIG. 3 shows the effect of the centrifuge operation on the trapped air bubble 16 shown in FIG. 1. The water molecules of the juice are moved to one side of the bubble by the centrifugal force (giving rise to centrifugal acceleration). The wall formed around the air bubble will eventually rupture as shown. Thus, the centrifuge operation may provide separation of foam and more pure liquid because of the different density of the foam, but it may also rupture of the air bubbles if the centrifugal forces are sufficient. The effect of the centrifugal action on the foam depends on the processing time, input flow rate, path length of the juice in the chamber, the fluid density, the rotation speed and the radius of the chamber. Other forces may also play a role, such as vibration or shaking.

Figure 4:
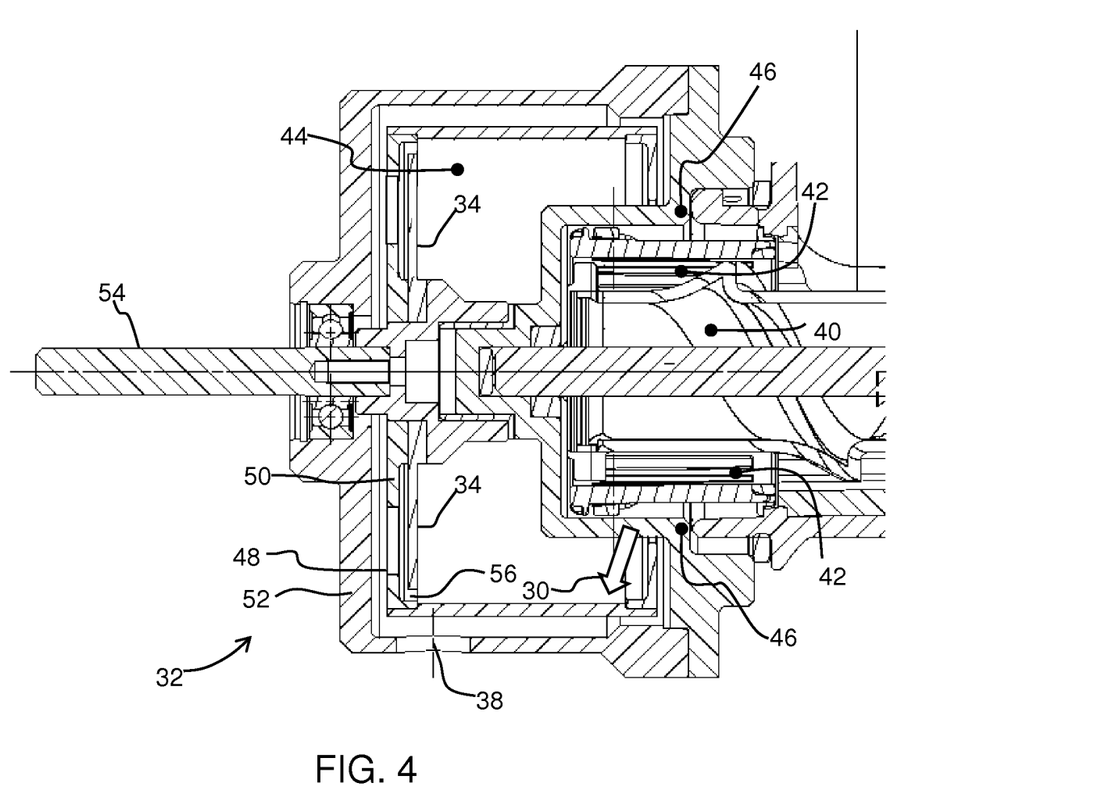
FIG. 4 shows a first example of juicer in accordance with an example of the invention in more detail.

FIG. 4 shows one example of the centrifuge unit in more detail. The extracted juice 30 is delivered by a masticating juicer, wherein the auger gear is shown as 40 and the output sieve is shown as 42. The juice is supplied to a chamber 44 of the centrifuge unit 32.

The juice passes through an auger cap 46 which guides the juice through transfer holes located at the circumference into the chamber 44. The juice may enter the chamber at any location. The chamber is formed as a rotating cylinder. Inside the rotating cylinder, the juice absorbs rotational energy and starts to spin as well. The rotating cylinder preferably has stirring blades (not shown) for entraining the rotation of the chamber contents (in addition to the rotation entrained by the friction with the rotating chamber wall).

The centrifugal forces urge the juice radially outwardly, but once the juice is pressed against the outer radial extremity of the chamber 44, it forms a rising layer up the sides of the chamber. The juice level rises until it reaches an outlet 48 of the chamber in the form of a set of holes. The chamber outlet holes are set back from the very outer portion of the chamber so that only juice which has risen up an axial outlet wall 50 of the chamber can reach the outlet 48.

After passing through the outlet 48, the juice is collected in a cavity formed between the rotating wall 50 and a non-rotating cylinder shell 52. The juice then flows to a final juice container (such as a glass or jar, not shown) via the external outlet 38.

The centrifuge rotation may be provided by an external power supply i.e. external motor) via a shaft 54. However, this shaft may be internal to the juicer and may be the same shaft that rotates to drive the main juicer arrangement so that a single motor is shared.

The output gate 34 comprises a blocking element which covers the chamber outlet 48 and defines a gap 56 between an outer edge of the blocking element 34 and an outer wall of the chamber 44 such that the juice component passes through the gap 56 before reaching the chamber outlet 48. In this way, only the juice which is at the very radial outer edge of the chamber 44 is passed to the outlet. Thus, only the more dense clear juice reaches the outlet, having passed around a labyrinth type gate.

Figure 5:
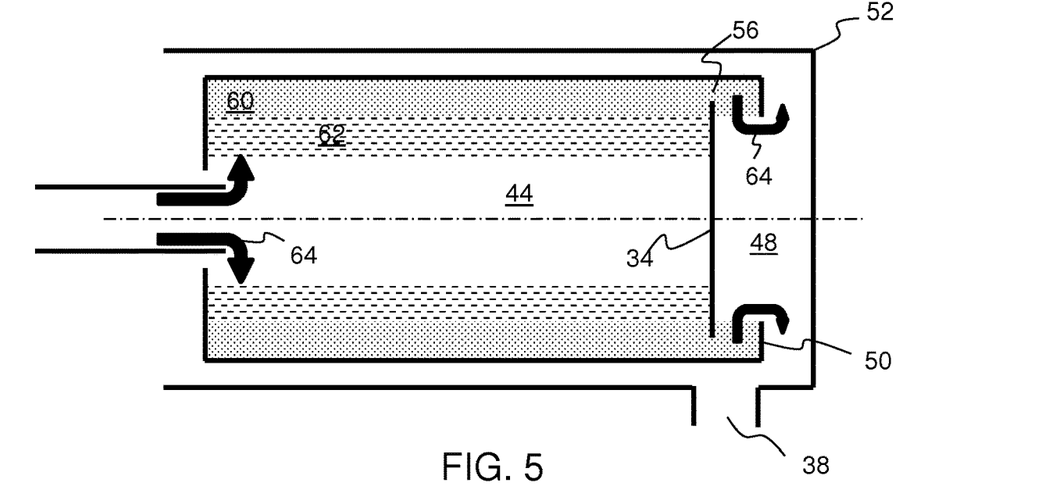
FIG. 5 shows how the output gate provides a filtering function.

FIG. 5 shows the function of the output gate 34. It shows the liquid juice 60 and the foam 62. The flow paths 64 show the passage of the juice into the chamber 44 and the passage of the liquid juice through the gap 56 to the outlet 48, which for example has a larger diameter than the inlet hole. Only the juice portion without air bubbles is forced to pass the gap 56. The foam layer remains in the chamber 44. When all the juice has been extracted, the remaining foam also stays in the chamber because the chamber outlet 48 is radially in from the outer edge of the chamber 44.

The dimensions of the various parts will influence the function performed, such as the width of the gap 56 and the distance by which the outlet 48 is radially set back from the outer wall.

As mentioned above, the invention can be applied to any appliance which extracts juice which may contain foam. The example of FIG. 4 is a horizontal masticating juicer with the centrifuge unit as an integral part of the juicer, but with the juicing and centrifuge operations in series.

Figure 6:
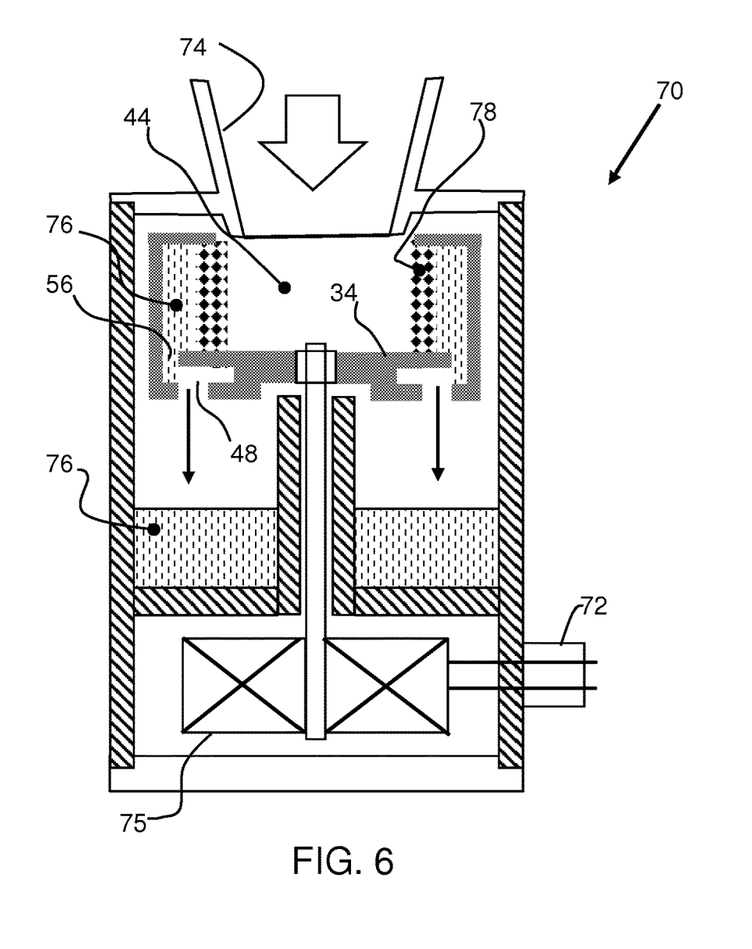
FIG. 6 shows a centrifuge unit to form part of a juicer in accordance with a second example of the invention.

FIG. 6 shows an example of a stand-alone foam separation centrifuge unit 70. It is part of an overall juicer apparatus, and for example has an electrical connector 72 which enables it to be connected to the juicer part (not shown) of the overall juicer apparatus. Thus, the foam separation unit may be powered by the juicer as part of a modular overall system.

The unit 70 comprises an inlet 74 for receiving juice from the juicer which includes foam. The juice is provided manually to the unit 70.

As in the example of FIG. 4, the centrifuge unit 70 defines a chamber 44 which is formed as a rotating cylinder but mounted vertically in this example. The rotating cylinder may again have stirring blades (not shown). The rotating cylinder is driven by a motor 75.

The centrifugal forces urge the juice radially outwardly, and then the juice flows because of the liquid pressure to pass the gap 56 of the outlet gate 34 and reach the outlet 48.

The liquid juice 76 collects in a jar portion beneath the centrifuge and the foam 78 remains stored in the chamber 44. As explained further below, different designs will result in different amounts of remaining foam, and will therefore have different foam storage requirements.

The examples of FIGS. 4 and 6 provide separate sequential juicing and centrifuge operations. While the foam separation (or destruction) must take place after the juicing, they may share a processing chamber.

Figure 7:
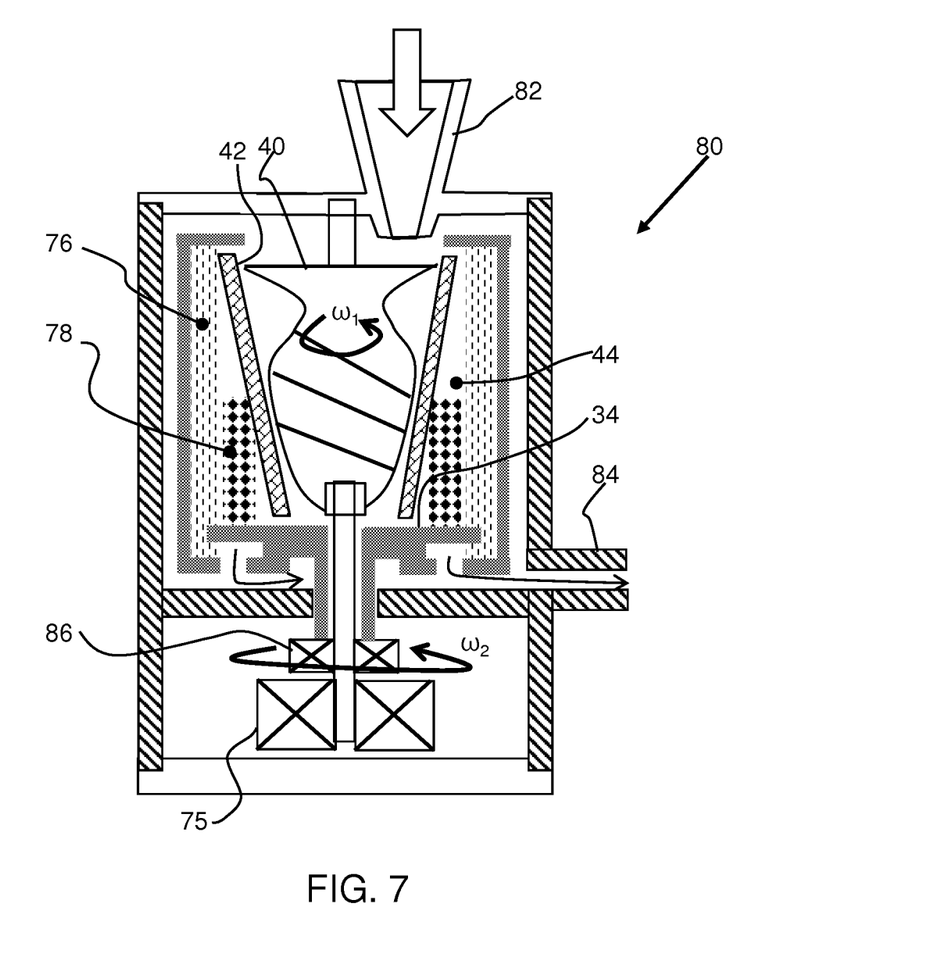
FIG. 7 shows a third example of a juicer in accordance with the invention.

FIG. 7 shows an example of a vertical masticating juicer 80 with an integrated centrifuge unit, and with a shared processing chamber.

The juicer 80 comprises an inlet 82 for receiving whole fruit or vegetables. The fruit or vegetables reach a masticating auger 40 around which is the output sieve or mesh 42. The centrifuge processing volume 44 is radially outside the sieve 42 and it receives the juice and foam mixture from the auger. The centrifuge unit then functions in the same way as in FIG. 6, and it delivers the juice to an outlet 84. The rotating cylinder may again have stirring blades (not shown).

The rotational speed $\omega_1$ of the auger is likely to be lower than the required rotational speed $\omega_2$ of the centrifuge unit. For this purpose, the auger 40 is driven directly by the motor 75 and a gear arrangement 86 is provided for stepping up the rotational speed for the centrifuge unit. By way of example, the gear arrangement 86 may implement a 20 times rotational speed increase, with a 20:1 gear ratio.

The juicer 80 stores foam in the chamber 44. The auger may be a cutter or any other food processing element which extracts juice. The desired rotational speed will depend on the type of device, for example depending on whether a horizontal or vertical arrangement is used.

In general, it is required to have enough active processing time in the centrifuge unit to enable separation of liquid phase and gaseous phase. To ensure that, tests have shown that the capacity of the centrifuge chamber 44 is preferably at least 10 times the flowrate (per second) of the juicer so that there is at least 10 seconds processing time (since the capacity is the flow rate multiplied by the processing time). For optimal separation and/or foam destruction, the centrifuge chamber capacity may be at least 20 times me input flow rate. By way of example, the input flow rate for masticators is between 4 and 10 ml/sec and for centrifugal juicers 10 to 20 ml/sec.

As mentioned above the speed of operation of the centrifuge unit, and the corresponding centrifugal forces, will influence the resulting effect on the liquid being processed. It has been found by experiment that there are three different effects which correlate to different centrifugal forces and hence rotational speeds.

A low speed operation may be used to give centrifugal acceleration of 50 to 200 m/s$^2$. Only foam separation takes place inside the centrifugal chamber. This means a large foam storage volume is necessary or else the foam has to be discharged into a separate container (e.g. a pulp container).

A medium speed operation may be used to give centrifugal acceleration of 200 to 900 m/s$^2$. There is foam separation but also partial foam destruction inside the centrifugal chamber. Only a small foam storage volume is necessary which leads to a more compact build volume of the centrifugal chamber. Due to the still relatively low revolution speed of the centrifugal drum there are no critical safety issues and the machine remains silent with minimal vibration.

A high speed operation may be used to give centrifugal acceleration of 900 to 3000 m/s². There is full or near full destruction of the foam. Very little foam storage volume is therefore necessary. Due to the high rotation rate, high centrifugal forces occur which means that the mechanical design becomes more involved.

Figure 8:
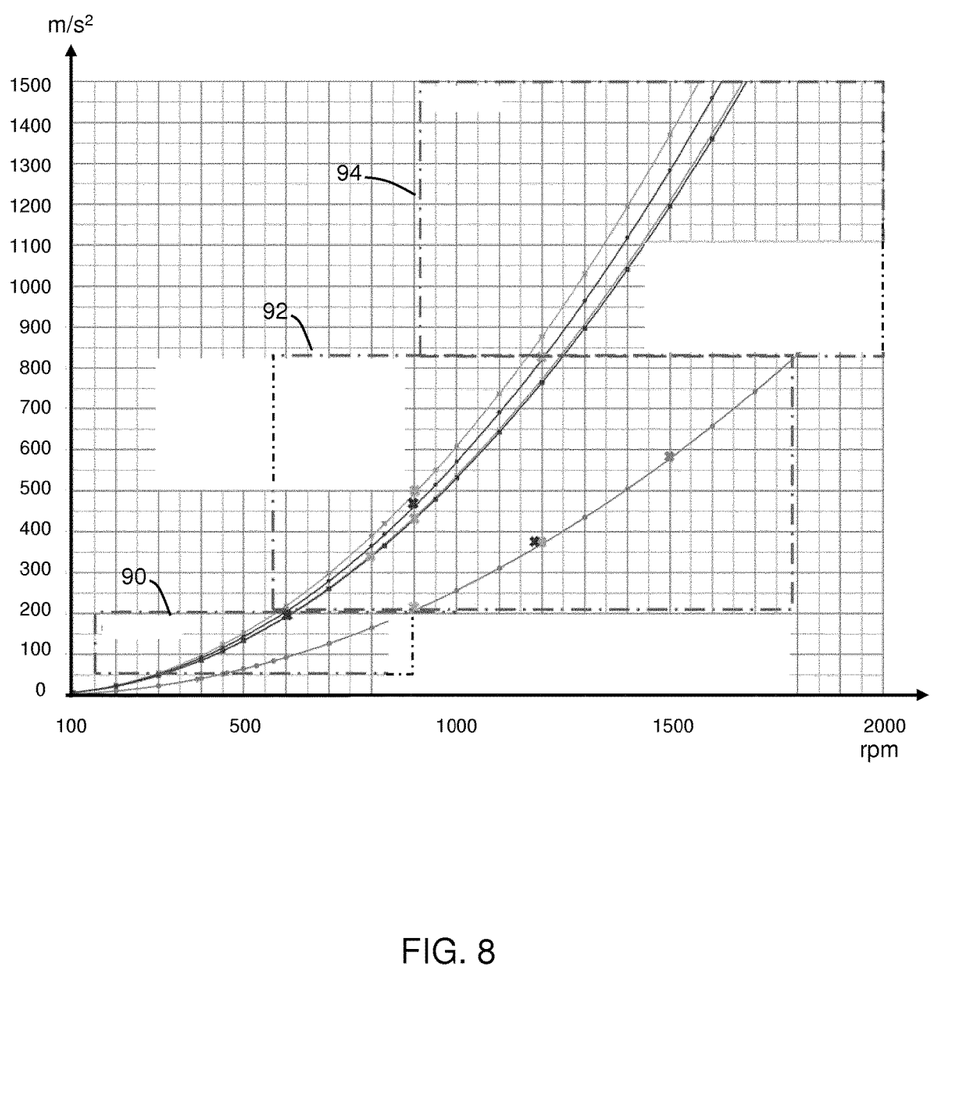
FIG. 8 shows test results to illustrate the performance of the inventive concept.

The test results giving rise to these findings are shown in FIG. 8 which plots the centrifugal acceleration (m/s²) against the rotational speed, for five different centrifuge designs. Note that the centrifugal acceleration is $\omega^2 r$ where r is the centrifuge radius and $\omega$ is the angular rotation speed (plotted on the x-axis).

Region 90 shows the low speed operation which provides only foam separation.

Region 92 shows the medium speed operation which provides partial foam destruction.

Region 94 shows the high speed operation which provides full foam destruction.

As shown, to achieve the desired centrifugal acceleration, different designs with different effective radius will need to be operated at different rotational speeds.

The middle region 92 may be preferred as providing a compromise between foam destruction (with the advantage of reduced storage requirement and reduced waste) and power consumption, vibration, and required mechanical tolerances. Foam destruction is particularly of interest because the foam is resistant to many other mechanical destruction approaches so otherwise needs to be stored and cleaned away after use.

A particular design of juicer is typically provided with one speed of operation for the centrifuge operation, so that the centrifuge operation is either turned on (to the speed for which the system is designed) or turned off.

However, the speed of rotation of the centrifuge may also be adjustable. This enables different modes of operation to be defined. For example, the speed of rotation of the centrifuge may be adjustable to define a first, slower revolution speed, foam separation mode and a second, faster revolution speed, foam destruction mode.

Thus, a single juicer apparatus may be able to operate in two or even all three, of the operation modes shown in FIG. 8.

Figure 9:
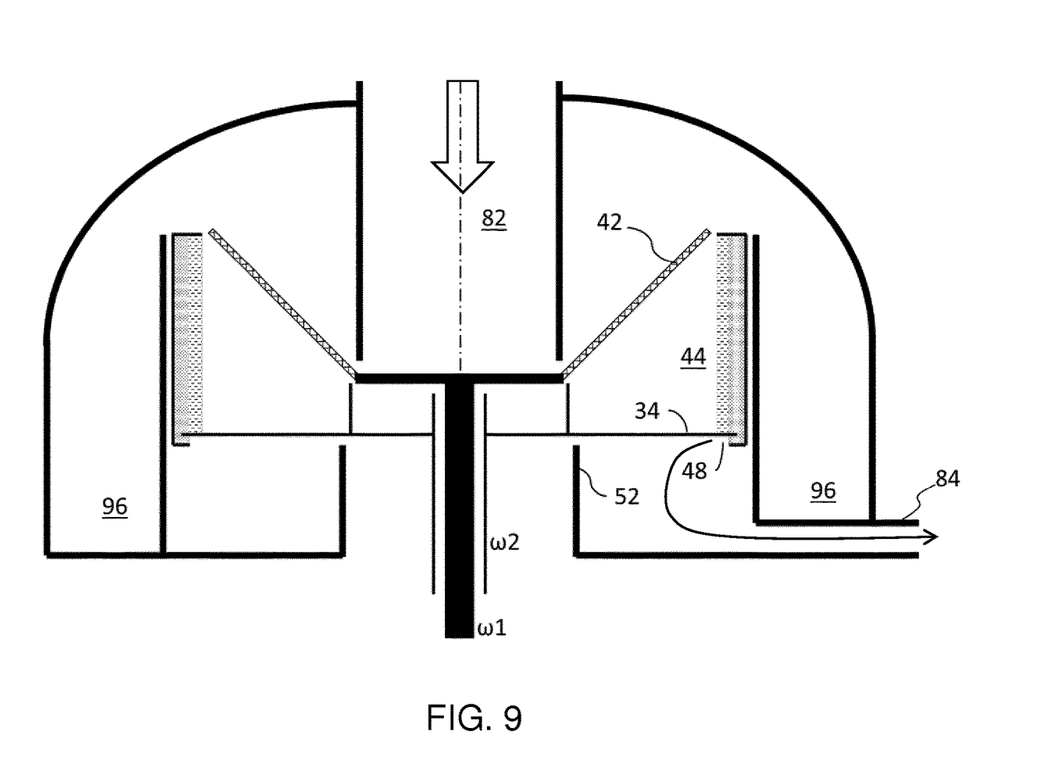
FIG. 9 shows a fourth example of a juicer in accordance with the invention.

FIG. 9 shows another example of a centrifugal juicer with foam destruction. It is similar in general configuration to the example of FIG. 7 and the same reference numbers are used for the same components. The juicer extracts juice by centrifugal forces which press the food against the sieve instead of using an auger. This design further comprises a pulp collection area 96. The sieve 42 is angled so that the pulp rises up the sieve 42 and passes over the top where it drops into the collection area 96. The centrifuge functions in the same way as described above.

Figure 10:
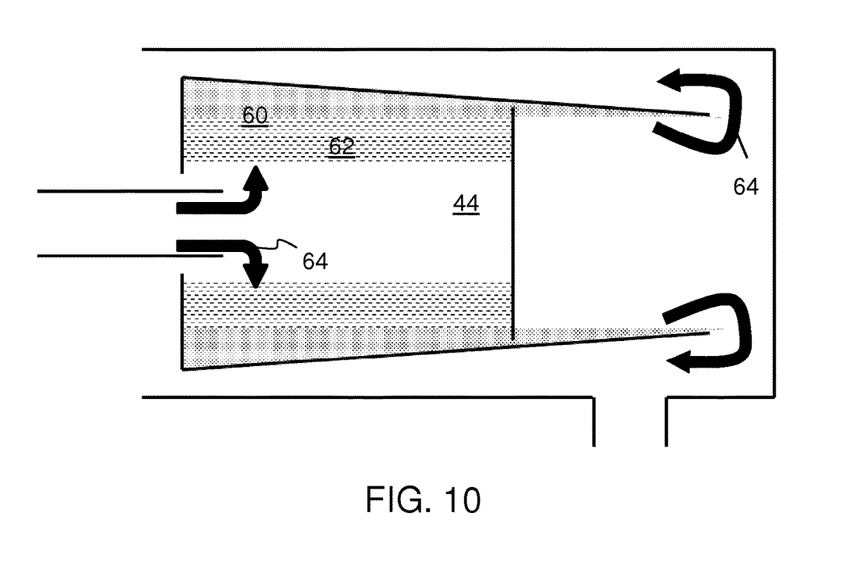
FIG. 10 shows an alternative design of centrifuge unit.

FIG. 10 shows that the centrifuge unit may have a conical design.

Figure 11:
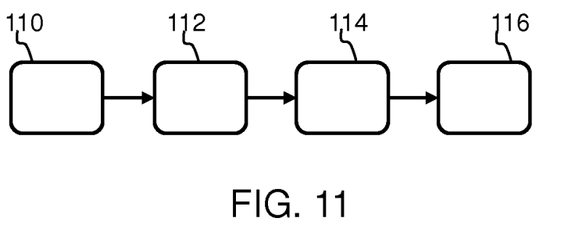
FIG. 11 shows a juicing method.

The invention also provides a juicing method as shown in FIG. 11, comprising:

in step 110, receiving food items to be juiced;
in step 112, providing extracted juice;
in step 114, performing centrifuging to the extracted juice to separate a juice component of the extracted juice from a foam component of the extracted juice; and
in step 116, passing the juice component through an output gate to an outlet from which the juice component is delivered.

In the example above, the output gate defines one annular channel opening around the outer edge of the chamber. There may be a more complex channel path.

Other variations to the disclosed embodiments can be understood and effected by those skilled in the art in practicing the claimed invention, from a study of the drawings, the disclosure, and the appended claims. In the claims, the word "comprising" Goes not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A juicer, comprising:
   an inlet for receiving food items to be juiced;
   a juice extracting arrangement for providing extracted juice;
   a pulp collection area to collect pulp of the extracted juice;
   a centrifuge unit for receiving the extracted juice and performing centrifuging to separate a juice component of the extracted juice from a foam component of the extracted juice, wherein the centrifuge unit comprises a chamber and an output gate for allowing the passage of the juice component, wherein the output gate comprises a blocking element that covers a chamber outlet of the chamber and defines a gap between an outer edge of the blocking element and an outer wall of the chamber to allow the juice component to pass through the gap before reaching the chamber outlet; and
   an outlet for delivering the juice component.

2. The juicer as claimed in claim 1, wherein the juice extracting arrangement comprises:
   a centrifugal juicer;
   a masticating juicer;
   a triturating juicer; or
   a blender.

3. The juicer as claimed in claim 1, wherein the chamber receives the extracted juice, wherein the chamber further comprises a chamber inlet and the chamber outlet, and wherein the chamber outlet is set back from an outer portion of the chamber.

4. The juicer as claimed in claim 1, wherein the juice extracting arrangement comprises a rotary juice extracting member, and a motor for driving the rotary juice extracting member.

5. The juicer as claimed in claim 4, wherein the chamber is driven to rotate by the same motor.

6. The juicer as claimed in claim 5, further comprising a gearing arrangement to drive the chamber and the rotary juice extracting member at different rotational speeds.

7. The juicer as claimed in claim 4, wherein the chamber is driven to rotate by another motor.

8. The juicer as claimed in claim 1, wherein the centrifuge unit is:
   formed within a housing of the juicer; or
   formed as a detachable attachment to the housing of the juicer.

9. The juicer as claimed in claim 8 and in which the centrifuge unit is formed within the housing of the juicer, wherein the juice extracting arrangement and the centrifuge unit share a common juice extraction chamber.

10. The juicer as claimed in claim 1, wherein a centrifugal acceleration is at least 50 m/s².

11. The juicer as claimed in claim 1, wherein a centrifugal acceleration is in the range 200 to 900 m/s².

12. The juicer as claimed in claim 1, wherein the centrifuge unit comprises stirring blades.

13. The juicer as claimed in claim 1, wherein the centrifuge unit comprises one or more modes of operation, and wherein the one or more modes of operations is selectable by adjusting the rotational speed of the chamber of the centrifuge unit.

14. A juicing method, comprising:
   receiving food items to be juiced;
   in a first stage of the juicing method:
      providing extracted juice;
      collecting pulp of the extracted juice in a pulp collection area;
   in a second stage of the juicing method, performing centrifuging, in a centrifuge unit, to the extracted juice to separate a juice component of the extracted juice from a foam component of the extracted juice, wherein the centrifuge unit comprises a chamber and an output gate, wherein the output gate comprises a blocking element that covers a chamber outlet of the chamber and defines a gap between an outer edge of the blocking element and an outer wall of the chamber to allow the juice component to pass through the gap before reaching the chamber outlet; and
   passing the juice component through an output gate to an outlet from which the juice component is delivered.

15. The method as claimed in claim 14, comprising providing a centrifugal acceleration of at least 50 m/s$^2$.

* * * * *